(12) United States Patent
Matsuura et al.

(10) Patent No.: US 11,626,784 B2
(45) Date of Patent: Apr. 11, 2023

(54) STATOR STRUCTURE AND RESOLVER

(71) Applicant: MINEBEA MITSUMI Inc., Nagano (JP)

(72) Inventors: Mutsumi Matsuura, Shizuoka (JP); Takashi Nakagawa, Kanagawa (JP); Hiroshi Abe, Shizuoka (JP); Shinya Suzuki, Shizuoka (JP)

(73) Assignee: MINEBEA MITSUMI Inc., Nagano (JP)

( * ) Notice: Subject to any disclaimer, the term of this patent is extended or adjusted under 35 U.S.C. 154(b) by 450 days.

(21) Appl. No.: 16/962,011

(22) PCT Filed: Jan. 15, 2019

(86) PCT No.: PCT/JP2019/000897
§ 371 (c)(1),
(2) Date: Jul. 14, 2020

(87) PCT Pub. No.: WO2019/142776
PCT Pub. Date: Jul. 25, 2019

(65) Prior Publication Data
US 2021/0057974 A1    Feb. 25, 2021

(30) Foreign Application Priority Data

Jan. 18, 2018   (JP) .............................. JP2018-006652
Feb. 22, 2018   (JP) .............................. JP2018-029339

(51) Int. Cl.
*H02K 24/00*    (2006.01)
*G01D 5/20*    (2006.01)
(Continued)

(52) U.S. Cl.
CPC ............... *H02K 24/00* (2013.01); *G01D 5/20* (2013.01); *H02K 1/14* (2013.01); *H02K 1/165* (2013.01)

(58) Field of Classification Search
CPC .. G01D 5/20; H02K 1/14; H02K 1/16; H02K 1/165; H02K 24/00
(Continued)

(56) References Cited

U.S. PATENT DOCUMENTS 5,045,742 A      9/1991   Armstrong et al.
2006/0043965 A1   3/2006   Murakami et al.
(Continued)

FOREIGN PATENT DOCUMENTS

CN       1740749 A     3/2006
CN     102141412 A     8/2011
(Continued)

OTHER PUBLICATIONS

Tamagawa et al., English Machine Translation of JP 2006-064409 (Year: 2006).*
(Continued)

*Primary Examiner* — Rashad H Johnson
(74) *Attorney, Agent, or Firm* — Pearne & Gordon LLP

(57) ABSTRACT

A stator structure of an embodiment includes a stator core that comprises: a ring-shaped main body; and a plurality of teeth extending in a radial direction of the main body and arranged along a circumferential direction of the main body. The main body comprises a plurality of elongated holes that are formed in an arc shape along the circumferential direction of the main body and that are arranged along the circumferential direction of the main body, and a plurality of holes that are arranged along the circumferential direction of the main body between the teeth and the elongated holes in the radial direction of the main body. At least one of the holes is disposed between beams and the teeth located close to the beams, the beams being provided between the adjacent elongated holes.

5 Claims, 4 Drawing Sheets

(51) Int. Cl.
　　　*H02K 1/16*　　　(2006.01)
　　　*H02K 1/14*　　　(2006.01)
(58) Field of Classification Search
　　　USPC ................. 310/68 B, 71, 89; 324/207.13
　　　See application file for complete search history.

(56) References Cited

U.S. PATENT DOCUMENTS

| | | | |
|---|---|---|---|
| 2011/0169382 | A1 | 7/2011 | Coleman et al. |
| 2011/0279112 | A1 | 11/2011 | Aihara et al. |
| 2014/0084758 | A1 | 3/2014 | Ochiai et al. |
| 2015/0354995 | A1 | 12/2015 | Ochiai et al. |
| 2019/0214858 | A1* | 7/2019 | Oshikiri .................. F04D 29/62 |
| 2022/0278573 | A1* | 9/2022 | Hu ........................ H02K 1/2773 |

FOREIGN PATENT DOCUMENTS

| | | | |
|---|---|---|---|
| CN | 103812275 | A | 5/2014 |
| CN | 203708002 | U | 7/2014 |
| JP | 52-041803 | A | 3/1977 |
| JP | 04-217833 | A | 8/1992 |
| JP | 2006-064409 | A | 3/2006 |
| JP | 2011-239645 | A | 11/2011 |
| JP | 2012-135078 | A | 7/2012 |
| JP | 2012-217250 | A | 11/2012 |
| JP | 2014033588 | A | 2/2014 |
| JP | 2014-150703 | A | 8/2014 |
| JP | 2014-183607 | A | 9/2014 |

OTHER PUBLICATIONS

First Office Action dated Dec. 22, 2021 for corresponding Chinese Application No. 201980007433.0 and English translation.
Notice of Reasons for Refusal dated Sep. 7, 2021 for corresponding Japanese Application No. 2018-029339 and English translation.
Notification of Grant Patent Right dated May 6, 2022 for corresponding Chinese Application No. 201980007433.0 and English translation.
English translation of the Written Opinion for corresponding International Application No. PCT/JP2019/000897 dated Mar. 5, 2019.
International Search Report for corresponding International Application No. PCT/JP2019/000897 dated Mar. 5, 2019.
Written Opinion for corresponding International Application No. PCT/JP2019/000897 dated Mar. 5, 2019.

* cited by examiner

STATOR STRUCTURE AND RESOLVER

FIELD

The present invention relates to a stator structure and a resolver.

BACKGROUND

Resolvers have been conventionally known that detect a rotation angle of an electric rotating machine, such as a motor and a generator. Such a resolver includes: for example, a stator core that includes a plurality of teeth extending from the inner circumferential side to the center of a main body that is formed in a ring shape; and a rotor that is disposed to face the teeth in the interior of the stator core. A winding is wound around the teeth with an insulator, and the winding is made up of an exciting winding to which an exciting current is supplied from the outside, and two output windings that output two-phase signals in accordance with a rotation angle of the rotor.

Meanwhile, in a case in which an electric current flows through a winding of the electric rotating machine, the rotation angle of which is to be detected by the resolver, leakage fluxes from the winding of the electric rotating machine may get into the output windings in the stator structure. Consequently, the leakage fluxes may be superposed on waveforms of the signals output from the output windings, as a noise component, whereby the accuracy in detecting the angle of the resolver may be reduced. Thus, Patent Literature 1 has proposed a resolver configured such that a plurality of arc-shaped openings are formed in a main body of a stator core along the circumferential direction, and the arc-shaped openings make the outer edge of the stator core have high magnetic reluctance, and leakage fluxes are thus made difficult to reach inside the stator core, which can prevent a magnetic effect to windings wound around protruding magnetic poles that serve as teeth.

CITATION LIST

Patent Literature

Patent Literature 1: Japanese Laid-open Patent Publication No. 2014-150703

SUMMARY

Technical Problem

However, in the resolver disclosed in Patent Literature 1, leakage fluxes enter the inward region of the stator core through beams that are gaps provided between the adjacent arc-shaped openings, and the effect on the output windings wound around the protruding magnetic poles that serve as the teeth located close to the beams is great. Meanwhile, the effect on the output windings wound around the protruding magnetic poles that are located apart from the beams is small. For this reason, the effect on the output windings wound around the protruding magnetic poles differs depending on the position of each protruding magnetic pole, which results in variations in the noise component between the protruding magnetic poles, whereby the accuracy in detecting the angle of the resolver may be reduced.

The present invention has been made in view of the foregoing, and it is an object of the present invention to provide a stator structure and a resolver that decrease the range of variation in the effect on windings wound around teeth effected by fluxes entering from the outer circumferential side to the inner circumferential side of the stator structure, and that prevent a decrease in angle detection accuracy resulting from the outside fluxes.

Solution to Problem

It is an object of the present invention to at least partially solve the problems in the conventional technology. A stator structure of an embodiment of the present invention comprises: a stator core comprising a ring-shaped main body, and a plurality of teeth, the teeth extending in a radial direction of the main body and arranged along a circumferential direction of the main body. The main body comprises: a plurality of elongated holes that are formed in an arc shape along the circumferential direction of the main body and that are arranged along the circumferential direction of the main body, and a plurality of holes that are arranged along the circumferential direction of the main body between the teeth and the elongated holes in the radial direction of the main body. At least one of the holes is disposed between beams and the teeth located close to the beams, the beams being provided between the adjacent elongated holes.

Advantageous Effects of Invention

According to one aspect of the present invention, a decrease in angle detection accuracy that results from fluxes entering from the outer circumferential side to the inner circumferential side of a stator structure can be prevented.

DESCRIPTION OF EMBODIMENTS

A stator structure and a resolver according to an embodiment will be described below with reference to the drawings. The embodiment to be described below is not intended to limit uses of the stator structure and the resolver. The drawings are schematic, and it should be noted that dimensional relations between components, ratios of the components, or the like may differ from those in reality. Additionally, the drawings may include dimensional relations and ratios that are different from each other.

Constitutions of a Stator Structure and a Resolver

Figure 1:
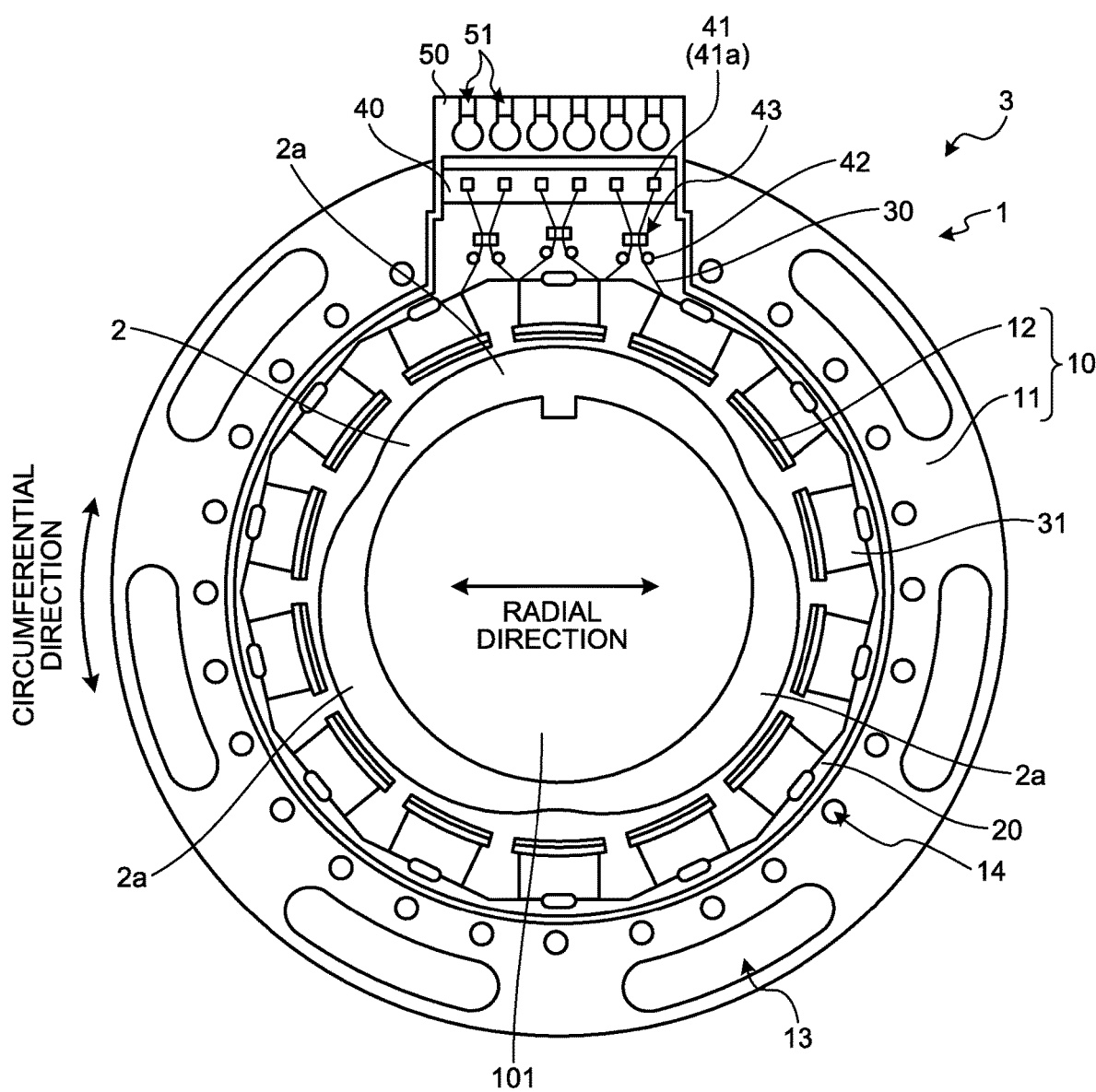
FIG. 1 is a top view illustrating a constitution of a stator structure according to an embodiment.

Constitutions of a stator structure 1 and a resolver 3 according to the embodiment will be described first with reference to FIG. 1 and FIG. 2. FIG. 1 is a top view illustrating the constitution of the stator structure 1 according to the embodiment.

A rotor 2 is provided in the interior of the stator structure 1 illustrated in FIG. 1, so that the resolver 3 according to the embodiment can be obtained. The resolver 3 according to the embodiment is a variable reluctance (VR) resolver. For example, as illustrated in FIG. 1, the resolver 3 is of an inner rotor type, and the rotor 2 is disposed in the interior of the stator structure 1.

Figure 2:
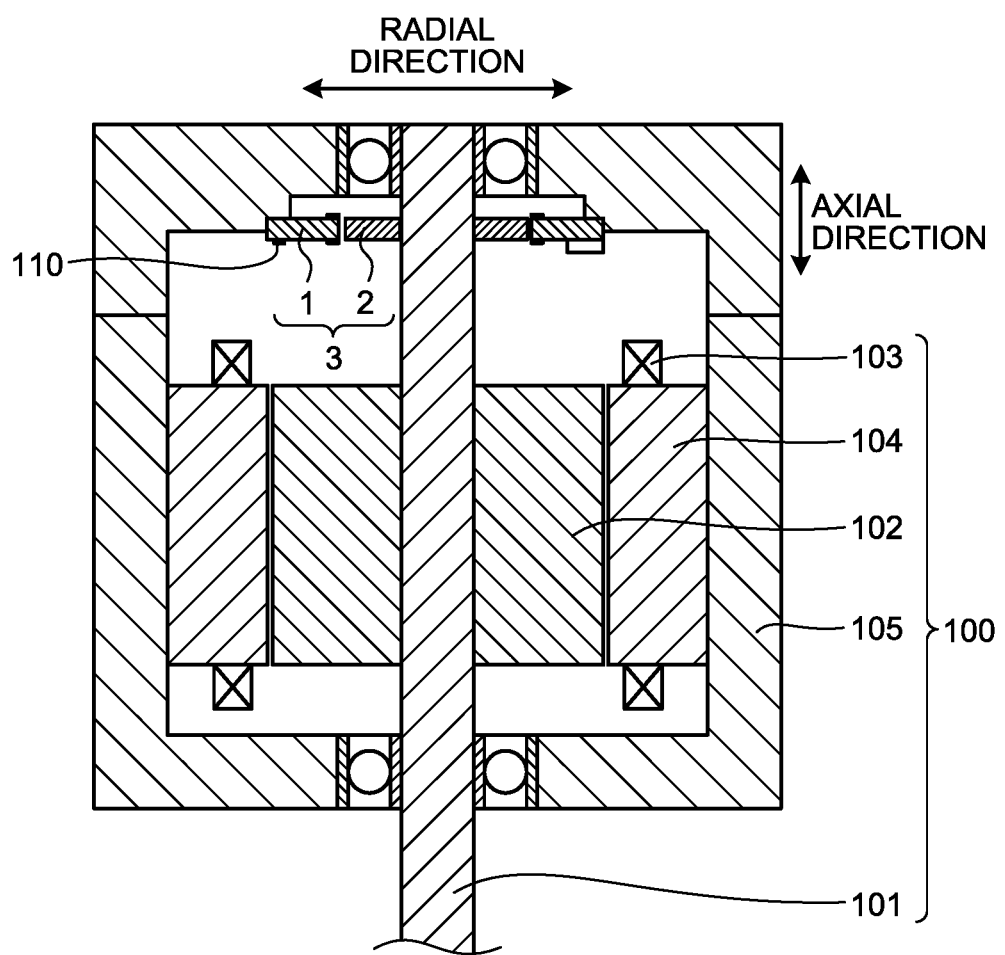
FIG. 2 is a sectional view illustrating an attachment state in which a resolver according to the embodiment is attached to an electric rotating machine.

FIG. 2 is a sectional view illustrating an attachment state in which the resolver 3 according to the embodiment is attached to an electric rotating machine 100. The rotor 2 is fixed to an output shaft 101 of the electric rotating machine 100, and is rotated as the output shaft 101 rotates. The electric rotating machine 100 is an alternating-current motor, an alternating-current generator, and an alternating-current motor generator, for example, and includes the output shaft 101, a rotor 102 fixed to the output shaft 101, and a stator structure 104 comprising a winding 103.

For example, in a case in which the electric rotating machine 100 is an alternating-current motor, the winding 103 of the stator structure 104 is an exciting winding. An exciting current flows through the exciting winding, thereby rotating the rotor 102 of the electric rotating machine 100, which in turn causes the output shaft 101 to rotate as the rotor 102 rotates.

The stator structure 1 is fixed to a housing 105 of the electric rotating machine 100 by bolts 110. The bolts 110 are formed of iron material, for example.

The description is returned to FIG. 1. The outer circumferential surface of the rotor 2 is formed in a noncircular shape so as to be uneven in the radial direction. The rotor 2 illustrated in FIG. 1 includes projections 2a on three locations of the outer circumferential surface, a case is illustrated in which the rotor 2 has a shaft angle multiplier of 3×. The rotor 2 may have a shaft angle multiplier of 1×, 2×, or equal to or higher than 4×.

The rotor 2 has a laminated structure in which a plurality of cores manufactured by stamping steel sheets, such as electromagnetic steel sheets made of soft magnetic material, are stacked on top of each other in layers.

The stator structure 1 includes a stator core 10, an insulator 20, a winding 30, a terminal block 40, and a lead wire holder 50.

The stator core 10 has a laminated structure in which a plurality of steel sheets, such as electromagnetic steel sheets, are stacked on top of each other in layers. The stator core 10 includes a main body 11 and a plurality of teeth 12. The main body 11 has a ring shape, and an annular ring shape in the embodiment. The teeth 12 extend from the inner circumferential side of the main body 11 toward the center of the main body 11 (in other words, in the radial direction).

Hereinafter, as illustrated in FIG. 1 and FIG. 2, a description is given with the radial direction, the axial direction, and the circumferential direction of the stator core 10 being defined. Herein, the "radial direction" refers to a direction orthogonal to the rotation axis of the rotor 2 that is rotated in the interior of the stator core 10, the "axial direction" refers to a direction that coincides with the axial direction of the rotation axis of the rotor 2, and the "circumferential direction" refers to a direction that coincides with the rotation direction of the rotor 2.

The main body 11 of the stator core 10 includes a plurality of elongated holes 13 and a plurality of holes 14 formed therein. The elongated holes 13 and the holes 14 are formed concentrically. The detailed constitution of the stator core 10 will be described later.

The insulator 20 is an insulating member and is formed by injection molding of an insulating resin, for example. The insulator 20 is formed by insert molding like the stator core 10 being encapsulated therein, for example, and covers the stator core 10 from both sides in the axial direction.

The winding 30 includes a conducting wire and an insulating coating that covers the periphery of the conducting wire. The conducting wire is a metallic wire, such as a copper wire, an aluminum wire, and a brass wire, for example. The winding 30 is wound around each of the teeth 12 via the insulator 20, so as to form a plurality of coils 31.

The coils 31 are each made up of an exciting winding and an output winding. The output winding of the coil 31 is made up of a sin phase output winding for outputting a sin phase output signal and a cos phase output winding for outputting a cos phase output signal.

The terminal block 40 is formed in the insulator 20 and extends outward from the insulator 20 in the radial direction. The terminal block 40 includes a plurality of (six in the embodiment) terminals 41 supported thereon.

The terminals 41 are conductive members, such as metal, and each have, at one end, a binding part 41a that protrudes from the terminal block 40 in the axial direction so as to be erected. To the binding part 41a, the ends of the winding 30 that constitutes the corresponding coil 31 are bound.

For example, to each of binding part 41a of the six terminals 41, a winding start of the exciting winding, a winding end of the exciting winding, a winding start of the sin phase output winding, a winding end of the sin phase output winding, a winding start of the cos phase output winding, and a winding end of the cos phase output winding are bound.

By performing tungsten inert gas (TIG) welding on the binding part 41a to which the ends of the winding 30 are bound, for example, the winding 30 and the binding part 41a can be electrically connected to each other.

The other end of the terminal 41 is accommodated in the lead wire holder 50 extending outward from the terminal block 40 in the radial direction. In the lead wire holder 50, a plurality of groove-like insertion parts 51 are formed as illustrated in FIG. 1. Lead wires (not illustrated) extending from an external device (not illustrated) are inserted and held in the insertion parts 51.

The insertion parts 51 each have the other end of the terminal 41 provided so as to be exposed therein, so that, by inserting the lead wire into the corresponding insertion part 51, the lead wire and the terminal 41 can be electrically connected to each other. For example, by performing resistance welding on a portion where the lead wire is in contact with the terminal 41, the lead wire and the terminal 41 can be electrically connected to each other.

The winding 30 is guided by a guide 42 and extends from the coil 31 toward the binding part 41a, following a predetermined path, as illustrated in FIG. 1. The guide 42 is a pin-shaped guide pin that is erected at a predetermined position of the terminal block 40, for example. The guide 42 is provided individually to each of a plurality of the windings 30 that are bound to the binding parts 41a.

In order to reduce the effect of thermal expansion due to a change in temperature, the winding 30 includes a sag formed between the coil 31 and the binding part 41a. The sag is formed such that sagging pins (not illustrated) are inserted into a plurality of insertion holes 43 formed in the terminal block 40, the windings 30 are bound to the binding parts 41a while being caught on the sagging pins, and afterward the sagging pins are pulled out from the insertion holes 43.

Details of the Stator Core

Figure 3:
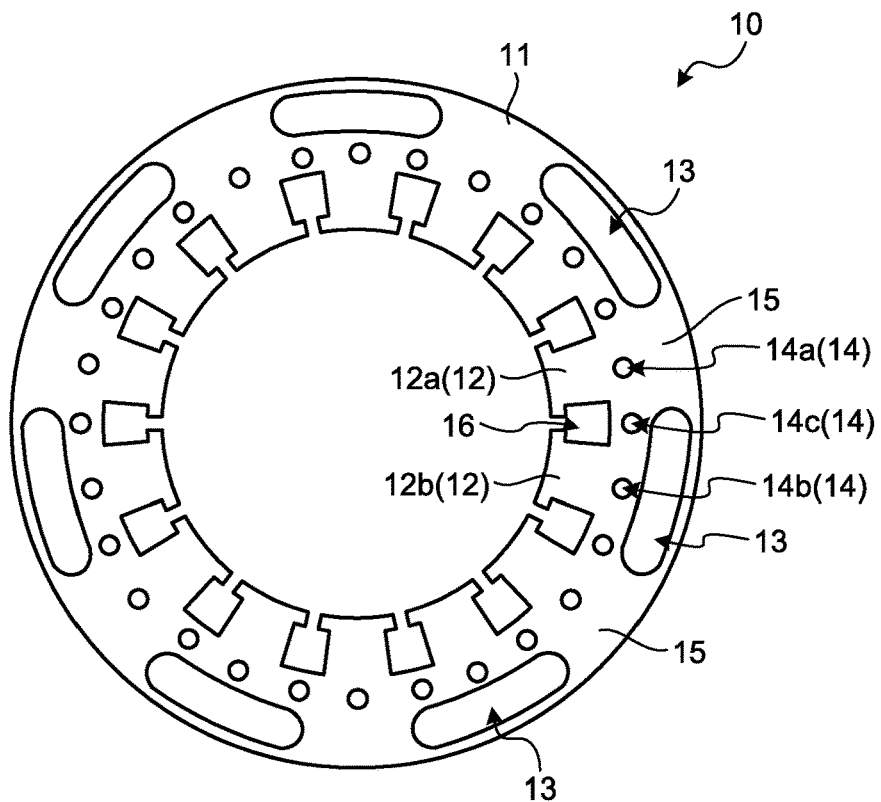
FIG. 3 is a top view illustrating a stator core according to the embodiment.

The details of the stator core 10 according to the embodiment will be described next with reference to FIG. 3 and FIG. 4. FIG. 3 is a top view illustrating the stator core 10 according to the embodiment. In the example illustrated in FIG. 3, the number of the teeth 12 is 14, the number of the arc-shaped elongated holes 13 is 7, the number of the holes 14 is 28. However, the numbers of the teeth 12, the elongated holes 13, and the holes 14 are not limited thereto.

The elongated hole 13 can be used as an insertion hole for inserting the bolt 110 to fix the resolver 3 to the housing 105 of the electric rotating machine 100. The elongated hole 13 penetrates in the axial direction, and is formed in an arc shape along the circumferential direction of the main body 11. The elongated holes 13 are formed in a rotationally symmetrical manner about the center of the main body 11, and are arranged along the circumferential direction of the main body 11.

For example, as illustrated in FIG. 3, the elongated holes 13 are disposed at equal angular intervals along the circumferential direction of the main body 11. The elongated holes 13 do not necessarily have to be disposed at equal angular intervals.

The main body 11 includes beams 15 for connecting the inner circumferential part and the outer circumferential part of the main body 11 provided between the adjacent elongated holes 13.

The teeth 12 are arranged along the circumferential direction on the inside of the main body 11. The teeth 12 include first teeth 12a that are located close to the beams 15, and second teeth 12b that are located apart from the beams 15 and close to the elongated holes 13. In the embodiment, the first teeth 12a and the second teeth 12b are disposed alternately. Between the adjacent teeth 12, slots 16 that are air-gaps are formed.

In a case in which an exciting current flows through the winding 103 of the electric rotating machine 100 illustrated in FIG. 2, leakage fluxes from the winding 103 of the electric rotating machine 100 may enter from the outer circumferential side to the inner circumferential side of the stator structure 1 in the resolver 3.

In the embodiment, the holes 14 penetrate in the axial direction, and are formed in a circular shape, as illustrated in FIG. 3. The holes 14 are disposed at equal angular intervals along the circumferential direction of the main body 11 on the outer circumferential side of the teeth 12 between the teeth 12 and the elongated holes 13. The holes 14 do not necessarily have to be disposed at equal angular intervals.

The holes 14 include first holes 14a that are each disposed between the first tooth 12a and the beam 15, second holes 14b that are each disposed between the second tooth 12b and then elongated hole 13, and third holes 14c that are each disposed between the slot 16 and the elongated hole 13. The effects of the holes 14 will be described next with reference to FIG. 4.

Figure 4:
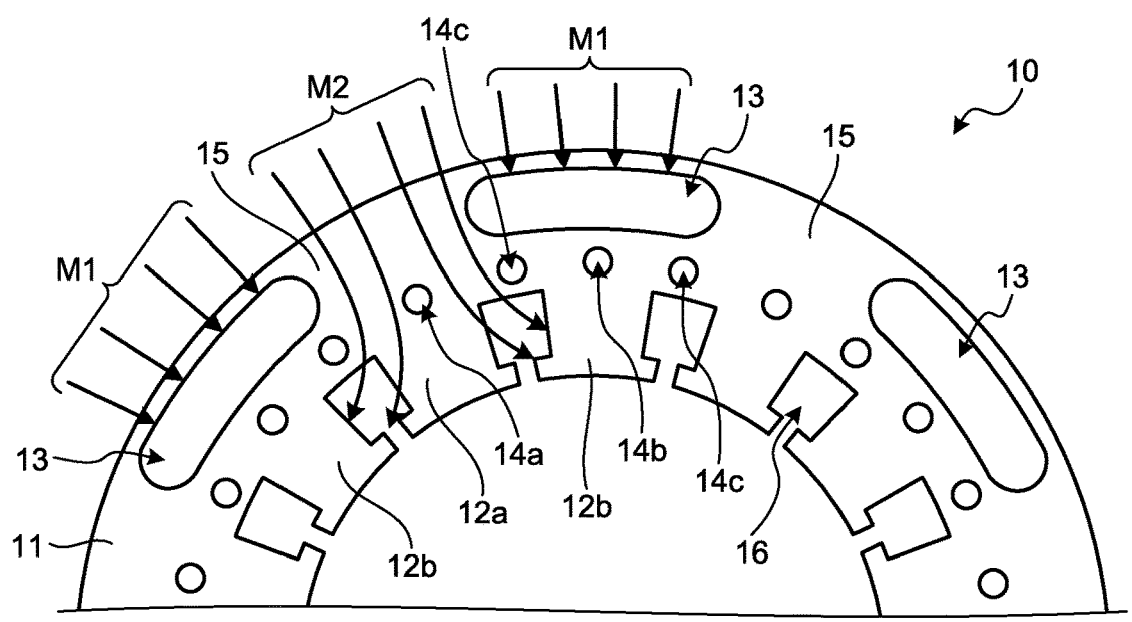
FIG. 4 is a diagram for illustrating a flow of leakage fluxes that enter the stator core according to the embodiment from the outer circumferential side to the inner circumferential side thereof.

FIG. 4 is a diagram for illustrating a flow of leakage fluxes M1, M2 that enter from the outer circumferential side to the inner circumferential side of the stator core 10 according to the embodiment. As described above, of the leakage fluxes M1, M2 entering from the outer circumferential side, the leakage fluxes M1 entering the elongated holes 13 is prevented from entering the elongated holes 13 due to high magnetic reluctance in the elongated holes 13 that serve as air-gaps. Meanwhile, the leakage fluxes M2 entering the beams 15 are not blocked by the beams 15, so that the leakage fluxes M2 enter into regions where the holes 14 are formed.

In the embodiment, because the first holes 14a are each disposed between the first tooth 12a and the beam 15, the leakage fluxes M2 enter in such a manner as to go around the first holes 14a, and flow toward the first teeth 12a and the second teeth 12b adjacent to the first teeth 12a, as illustrated in FIG. 4.

In a case in which the first holes 14a are not provided, the leakage fluxes M2 entering from the outer circumferential side of the stator core 10 through the beams 15 have a great effect on the coils 31 wound around the first teeth 12a, which causes variations to be wider from the effect on the coils 31 wound around the second teeth 12b by the leakage fluxes M2 have. Contrarily, in the embodiment, the first holes 14a are provided, thereby reducing the effect on the coils 31 wound around the first teeth 12a and increasing the effect on the coils 31 wound around the second teeth 12b, which prevents variations between the effect on the coils 31 wound around the first teeth 12a and the effect on the coils 31 wound around the second teeth 12b.

In other words, in the embodiment, the effect on the coils 31 wound around the first teeth 12a from the outer circumferential side of the stator core 10 becomes smaller, and the effect on the coils 31 wound around the second teeth 12b from the outer circumferential side of the stator core 10 becomes greater, so that variations can be smaller between the effect on the coils 31 wound around the first teeth 12a and the effect on the coils 31 wound around the second teeth 12b. As a result of this, according to the embodiment, a decrease in angle detection accuracy that results from the leakage fluxes M1, M2 entering from the outer circumferential side of the stator core 10 can be prevented.

In the embodiment, the holes 14 are arranged at equal angular intervals along the circumferential direction of the main body 11. Consequently, the range of variation can be narrowed in the effect on the coils 31 wound around the teeth 12 by the leakage fluxes M1, M2 entering, from the entire outer circumferential side, the teeth 12 disposed along the entire inner circumference. Thus, according to the embodiment, a decrease in angle detection accuracy can be further prevented that results from the leakage fluxes M1, M2 entering from the outer circumferential side of the stator core 10.

In the embodiment, all the holes 14 have the same shape. In this manner, the holes 14 can be utilized as part of the insertion holes 43 for inserting the sagging pins described above. Thus, according to the embodiment, the insertion holes 43 can be formed easily to be used to form a sag in the winding 30.

MODIFICATION

A modification of the embodiment will be described next with reference to FIG. 5 and FIG. 6. In the following description, the same components as those in the embodiment may be given the same signs, and duplicating description may be omitted.

Figure 5:
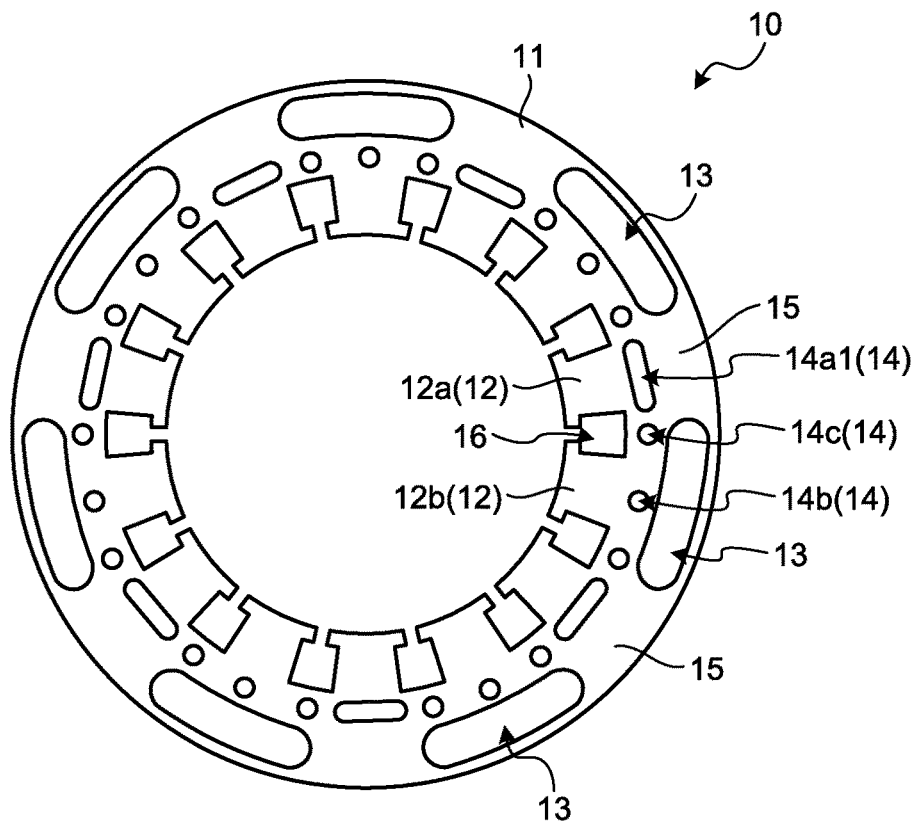
FIG. 5 is a top view illustrating a stator core according to a modification of the embodiment.

FIG. 5 is a top view illustrating the stator core 10 according to the modification of the embodiment. FIG. 6 is a diagram for illustrating a flow of the leakage fluxes M1, M2 that enter the stator core 10 according to the modification of the embodiment from the outer circumferential side of the stator core 10.

As illustrated in FIG. 5, the main body 11 of the stator core 10 in the modification includes first holes 14a1 formed therein that each have a shape different from those of the second holes 14b and the third holes 14c. The first hole 14a1 of the modification penetrates in the axial direction, and is formed as an elongated hole in an arc shape along the circumferential direction of the main body 11.

Figure 6:
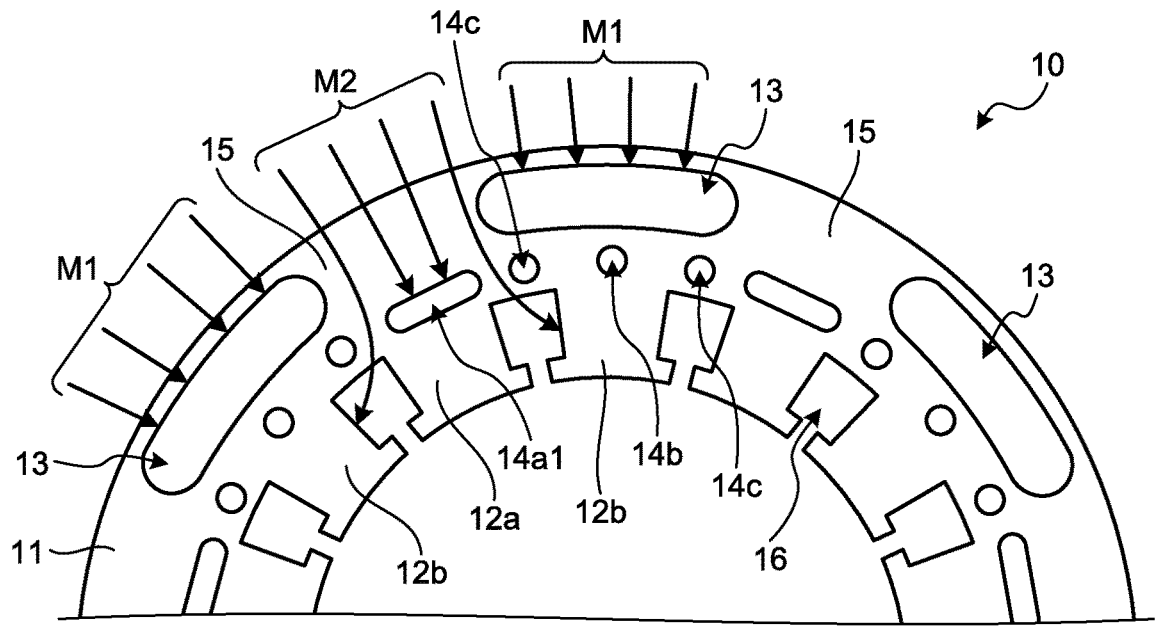
FIG. 6 is a diagram for illustrating a flow of leakage fluxes that enter the stator core according to the modification of the embodiment from the outer circumferential side to the inner circumferential side thereof.

In other words, the first holes 14a1 of the modification are formed at a larger angle in the circumferential direction than that of the first holes 14a of the embodiment, so that the leakage fluxes M2 entering the inner circumferential side through the beams 15 are blocked by the first holes 14a1, as illustrated in FIG. 6. Accordingly, the effect on the coils 31 wound around the first teeth 12a can be reduced.

Consequently, because the effect on the coils 31 wound around the first teeth 12a by the leakage fluxes M2 can be reduced more, variations can be further reduced between the effect on the coils 31 wound around the first teeth 12a and the effect on the coils 31 wound around the second teeth 12b. Therefore, according to the embodiment, a decrease in angle detection accuracy can be further prevented that results from the leakage fluxes M1, M2 entering from the outer circumferential side to the inner circumferential side of the stator core 10.

In the modification, the first holes 14a1 are formed in a rotationally symmetrical manner about the center of the main body 11. However, the first holes 14a1 do not necessarily have to be formed in a rotationally symmetrical manner about the center of the main body 11.

While the embodiment of the present invention has been described above, the present invention is not limited to the embodiment, and various changes may be made without departing from the spirit of the invention. For example, while the embodiment has presented the example in which the second holes 14b and the third holes 14c are formed in the same shape, the second holes 14b and the third holes 14c may be formed in shapes different from each other.

While the embodiment has presented the example in which the elongated holes 13 are formed in an arc shape, the elongated holes 13 may be formed in a linear fashion along the circumferential direction of the main body 11, or may have a circular or rectangular shape. While the embodiment has presented the example in which the holes 14 are formed in a circular shape, the holes 14 are not limited to having a circular shape, and may have an elongated or rectangular shape.

While the embodiment has presented the example in which the insulator 20 is formed in one piece, the insulator may be formed by splitting it in two in the axial direction, and the two insulators may be provided so as to sandwich the stator core 10 therebetween. Additionally, while the embodiment has presented the case in which the present invention is applied to the inner-rotor-type resolver 3, the present invention may be applied to an outer-rotor-type resolver.

As described above, the stator structure 1 according to the embodiment and the modification includes the stator core 10 that includes: the ring-shaped main body 11; and the teeth 12 extending in the radial direction of the main body 11 and arranged along the circumferential direction of the main body 11. The main body 11 includes the elongated holes 13 that are formed in an arc shape along the circumferential direction of the main body 11 and that are arranged along the circumferential direction of the main body 11, and the holes 14 that are arranged along the circumferential direction of the main body 11 between the teeth 12 and the elongated holes 13 in the radial direction of the main body 11. At least one of the holes (the first holes 14a (14a1)) is disposed between the beams 15 and the teeth 12 located close to the beams 15, the beams 15 being provided between the adjacent elongated holes 13. Consequently, a decrease in angle detection accuracy that results from the leakage fluxes M1, M2 entering from the outer circumferential side can be prevented.

In the stator structure 1 according to the embodiment and the modification, the holes 14 are arranged at equal angular intervals along the circumferential direction of the main body 11. Consequently, a decrease in angle detection accuracy that results from the leakage fluxes M1, M2 entering from the outer circumferential side can be further prevented.

In the stator structure 1 according to the embodiment, all the holes 14 have the same shape. Consequently, the stator core 10 can be manufactured easily and the insertion holes 43 to be used to form a sag in the winding 30 can be formed easily.

In the stator structure 1 according to the modification, the holes (the first holes 14a1) that are disposed between the beams 15 and the teeth (the first teeth 12a) located close to the beams 15 are larger than the holes (the second holes 14b, the third holes 14c) that are not disposed between the beams 15 and the teeth (the first teeth 12a) located close to the beams 15. Consequently, a decrease in angle detection accuracy that results from the leakage fluxes M1, M2 entering from the outer circumferential side of the stator core 10 can be further prevented.

The number of the third holes 14c that are formed between the first holes 14a and the second holes 14b is not limited to one, and the number can be determined taking into account the effect of the leakage fluxes entering from the beams 15 of the stator core 10 to the inner circumferential side of the stator core 10.

The above embodiment is not intended to limit the present invention. Any constitution created by combining the components described above as appropriate is also included in the present invention. Additional effects and modifications may be derived easily by a person skilled in the art. Therefore, a variety of other aspects of the present invention are not limited to the embodiment, and various changes may be made.

REFERENCE SIGNS LIST 1 stator structure
2 rotor
3 resolver
10 stator core
11 main body
12 teeth
12a first teeth
12b second teeth
13 elongated hole
14 hole
14a, 14a1 first hole
14b second hole
14c third hole
15 beam
16 slot
20 insulator
30 winding
31 coil
40 terminal block
50 lead wire holder
100 electric rotating machine
M1, M2 leakage flux

The invention claimed is:

1. A stator structure comprising:
   a stator core comprising a ring-shaped main body and a plurality of teeth, the teeth extending in a radial direction of the main body and arranged along a circumferential direction of the main body,
   the main body comprising
      a plurality of elongated holes that are formed in an arc shape along the circumferential direction of the main body and that are arranged along the circumferential direction of the main body, and
      a plurality of holes that are arranged along the circumferential direction of the main body between the teeth and the elongated holes in the radial direction of the main body, wherein
   at least one of the holes is disposed between beams and the teeth located close to the beams, the beams being provided between the adjacent elongated holes.

2. The stator structure according to claim 1, wherein the holes are arranged at equal angular intervals along the circumferential direction of the main body.

3. The stator structure according to claim 1, wherein all the holes have an identical shape.

4. The stator structure according to claim 1, wherein the holes that are disposed between the beams and the teeth located close to the beams are larger than the holes that are not disposed between the beams and the teeth located close to the beams.

5. A resolver, comprising:
   a rotor; and
   the stator structure according to claim 1.

* * * * *